United States Patent [19]
Tani

[11] Patent Number: 5,929,947
[45] Date of Patent: Jul. 27, 1999

[54] LIQUID CRYSTAL DISPLAY THIN FILM TRANSISTOR ARRAY WITH REDUNDANT FILM FORMED OVER A CONTACT HOLE AND METHOD OF FABRICATING THE SAME

[75] Inventor: Masatoshi Tani, Tokyo, Japan

[73] Assignee: NEC Corporation, Tokyo, Japan

[21] Appl. No.: 09/168,085

[22] Filed: Oct. 8, 1998

[30] Foreign Application Priority Data

Oct. 8, 1997 [JP] Japan ................................. 9-275507

[51] Int. Cl.⁶ .................................................. G02F 1/136
[52] U.S. Cl. .................................. 349/42; 349/46; 349/54
[58] Field of Search ............................ 349/42, 46, 54

[56] References Cited

U.S. PATENT DOCUMENTS

| | | | |
|---|---|---|---|
| 5,621,555 | 4/1997 | Park | 349/54 |
| 5,852,305 | 12/1998 | Lee et al. | 257/59 |
| 5,859,679 | 1/1999 | Song | 349/54 |

FOREIGN PATENT DOCUMENTS

| | | |
|---|---|---|
| 1-105575 | 4/1989 | Japan . |
| 4-52925 | 8/1992 | Japan . |
| 6-130416 | 5/1994 | Japan . |

Primary Examiner—William L. Sikes
Assistant Examiner—Robert J. Hollingshead
Attorney, Agent, or Firm—Sughrue, Mion, Zinn, Macpeak & Seas, PLLC

[57] ABSTRACT

A liquid crystal display thin film transistor array includes gate bus lines, drain bus lines electrically isolated from the gate bus lines by a first insulating film, a thin film transistor arranged near the intersection of the gate bus line and the drain bus line, and a pixel electrode made of a transparent conductive film. The thin film transistor includes a gate electrode, a drain electrode, and a source electrode. The pixel electrode is electrically isolated from the drain electrode and the drain bus line by a second insulating film. A contact hole for electrically connecting to the drain bus line is formed in the second insulating film stacked on the drain bus line in a region including the intersection of the gate bus line and the drain bus line. An interconnection redundant film made of the same transparent conductive film as the pixel electrode is formed on the second insulating film so as to cover the contact hole. A method of fabricating this array is also disclosed.

8 Claims, 16 Drawing Sheets

LIQUID CRYSTAL DISPLAY THIN FILM TRANSISTOR ARRAY WITH REDUNDANT FILM FORMED OVER A CONTACT HOLE AND METHOD OF FABRICATING THE SAME

BACKGROUND OF THE INVENTION

1. Field of the Invention

The present invention relates to a liquid crystal display thin film transistor array and a method of fabricating the same and, more particularly, to the structure of an active matrix liquid crystal display thin film transistor array which can prevent disconnection of a bus line and can be fabricated without increasing the number of conventional fabrication steps, and a method of fabricating the same.

2. Description of the Prior Art

Nowadays, with the rapid progress of an information-aligned society, flat displays replacing CRTs (Cathode Ray Tubes) have become important devices for extending the multimedia market as interfaces from various information terminals such as computers to human beings.

As flat displays, liquid crystal displays and plasma displays are promising. In particular, liquid crystal displays are developing the market with the spread of notebook personal computers and small information terminals. Of liquid crystal displays, active matrix liquid crystal displays have high display quality with high contrast on the entire screen because there is no crosstalk, compared to simple matrix liquid crystal displays such as STN displays. Therefore, active matrix liquid crystal displays have attracted attention not only as displays of small personal computers but also as view-finders of video cameras, projectors, and flat television sets.

In a liquid crystal display, a liquid crystal material is sandwiched between two electrodes having aligned surfaces, and an electric field is applied to a liquid crystal by applying a voltage to these electrodes. Consequently, the directions of liquid crystal molecules are controlled by this electric field, and the deflecting direction of light is modulated. In this manner, ON and OFF of light are controlled. As this liquid crystal material, a TN (Twisted Nematic) liquid crystal is often used.

Most recent active matrix liquid crystal displays operate in a normally white mode in which white is displayed by transmitting light when no electric field is applied between the two electrodes and black is displayed by transmitting no light when an electric field is applied. As an element for driving liquid crystal, a thin film transistor (to be referred to as a TFT hereinafter) having high response speed and high display quality is generally used.

An outline of the arrangement of a conventionally used active matrix liquid crystal display will be described below with reference to FIGS. 1 and 2.

FIG. 1 shows the basic arrangement of a TFT array of this conventional active matrix liquid crystal display. Referring to FIG. 1, a plurality of gate bus lines (scan lines) A1, A2, . . . , Am and a plurality of drain bus lines (signal lines) S1, S2, . . . , Sn are arranged in a matrix manner on a TFT substrate (not shown). TFTs C11, C12, . . . , Cmn are formed at the intersections of these gate bus lines and drain bus lines.

FIG. 2 shows an equivalent circuit of one pixel in the TFT array of the active matrix liquid crystal display shown in FIG 1. As shown in FIG 2, a gate G and a drain D of the TFT Cmn are connected to the gate bus line Am and the drain bus line Sn, respectively. A source S as the third electrode of the TFT Cmn is connected to a pixel electrode 116.

As described above, each TFT is selected by a gate bus line and a drain bus line, and an image signal voltage is written in the display pixel. In this manner, a desired image is displayed.

As one example of common active matrix TFT array structures, a structure and a method of fabricating the structure disclosed in Japanese Examined Patent Publication No. 4-52925 will be described below with reference to FIGS. 3, 4A to 4F, and 5A to 5F. FIG. 3 is a plan view showing the arrangement of electrodes and interconnections of one element in this conventional TFT array. FIGS. 4A to 4F and 5A to 5F are sectional views showing a process of fabricating sections taken along lines IV—IV and V—V, respectively, in FIG. 3 in order of fabrication steps.

The process of fabricating this conventional TFT array will be described below with reference to FIGS. 3, 4A to 4F, and 5A to 5F. First, as shown in FIGS. 4A and 5A, a gate bus line 101 made of a metal film of, e.g., Cr, Al, Ta, or Mo and a gate electrode 102 are patterned into predetermined shapes on a transparent insulating substrate 100 such as a glass substrate.

As shown in FIGS. 4B and 5B, an insulating layer a (gate oxide film) 103 made of a material such as a silicon oxide film or a silicon nitride film is formed. Additionally, a channel layer 104 made from intrinsic semiconductor amorphous silicon (to be referred to as "a-Si(I)" hereinafter) and a contact layer 105 made from n-type semiconductor amorphous silicon (to be referred to as "a-Si(n$^+$)" hereinafter) are formed in this order on the insulating layer a 103.

As shown in FIG. 4C, the channel layer 104 and the contact layer 105 are patterned. After that, a portion of the insulating layer a 103 is removed by patterning from the surface of the metal film of, e.g., Cr, Al, Ta, or Mo in a peripheral terminal portion (not shown) for mounting an external driving circuit for applying a signal to the gate bus line 101 and a drain bus line 106 (to be formed later).

Next, as shown in FIG. 4D, a pixel electrode 110 is patterned into a predetermined shape by using a transparent conductive material such as ITO.

Additionally, as shown in FIGS. 4E and 5E, the drain bus line 106, a drain electrode 107, and a source electrode 108 are patterned into predetermined shapes by using a metal film of, e.g., Cr, Al, Ta, or Mo in the same manner as the gate bus line 101 and the gate electrode 102. In this patterning, the source electrode 108 is so formed as to be electrically connected to the pixel electrode 110. To separate the drain electrode 107 from the source electrode 108, an unnecessary portion of the contact layer 105 on the channel layer 104 is etched away.

After that, as shown in FIGS. 4F and 5F, an insulating layer b (insulating interlayer) 109 made of a material such as a silicon nitride film is formed. A portion of this insulating layer b 109 is removed by patterning from the surface of the metal film of, e.g., Cr, Al, Ta, or Mo in the peripheral terminal portion (not shown) for mounting the external driving circuit for applying a signal to the gate bus line 101 and the drain bus line 106. In this way, a TFT array substrate is completed. In this TFT array substrate, the gate bus line 101 and the drain bus line 106 are insulated from each other by the insulating layer a 103.

In the conventional TFT array substrate obtained as described above, the drain bus line 106 and the pixel electrode 110 are formed on the same layer. Therefore, to prevent a short circuit, the drain bus line 106 and the pixel electrode 110 cannot be made close to each other. This makes it impossible to increase the aperture ratio (the ratio of an area which transmits light to the display area of the liquid crystal display). Additionally, a metal foreign matter or a pattern residue formed when the drain bus line 106 or the pixel electrode 110 is patterned short-circuits the drain bus line 106 and the pixel electrode 110. This results in a point defect.

Although not shown in the above prior art, as a method of preventing disconnection of the drain bus line 106, a transparent conductive film can also be formed below the drain bus line 106 by using the same material as the pixel electrode 110 when the pixel electrode 110 is formed. This two-layered drain bus line is also well known as one prior art. Even in this prior art, however, the drain bus line 106 and the pixel electrode 110 are formed on the same layer. Accordingly, the aperture ratio cannot be increased, and point defects readily occur.

Japanese Unexamined Patent Publication No. 6-130416 has disclosed an example of the structure of an active matrix TFT array for solving the problems of the above prior art explained with reference to FIGS. 3, 4A to 4F, and 5A to 5F. In the structure disclosed in Japanese Unexamined Patent Publication No. 6-130416, a storage capacitance electrode is separately formed. However, in the present invention to be described later, this storage capacitance electrode is formed on a gate bus line 101. For descriptive consistency, therefore, the drawings of the structure disclosed in Japanese Unexamined Patent Publication No. 6-130416 are slightly changed in the following explanation. The structure of this prior art and a method of fabricating the structure will be described below with reference to FIGS. 6, 7A to 7F, and 8A to 8F. FIG. 6 is a plan view showing the arrangement of electrodes and interconnections of one element in this conventional TFT array. FIGS. 7A to 7F and 8A to 8F are sectional views showing a process of fabricating sections taken along lines VII—VII and VIII—VIII, respectively, in FIG. 6 in order of fabrication steps.

The conventional TFT array shown in FIGS. 6, 7A to 7F, and 8A to 8F can be fabricated by the same process as explained above with reference to FIGS. 3, 4A to 4F, and 5A to 5F until the step of removing a portion of an insulating layer a 103 by patterning from the surface of a metal film of, e.g., Cr, Al, Ta, or Mo in a peripheral terminal portion (not shown) for mounting an external driving circuit for applying a signal to a gate bus line 101 and a drain bus line 106 (to be formed later), i.e., until the step shown in FIGS. 7C and 8C. Therefore, its detailed description will be omitted.

Next, as shown in FIGS. 7D and 8D, a 100- to 300-nm thick metal film of, e.g., Cr, Al, Ta, or Mo is formed by sputtering and patterned into a predetermined shape to form the drain bus line 106, a drain electrode 107, and a source electrode 108. Additionally, to divide a contact layer 105 into a portion on the drain electrode 107 side and a portion on the source electrode 108 side, an unnecessary portion of the contact layer 105 on the channel layer 104 is etched away.

After that, as shown in FIGS. 7E and 8E, to form an insulating layer b (insulating interlayer) 109 for separating the drain bus line 106 from a pixel electrode 110 (to be formed later), a 100- to 400-nm thick silicon nitride film is formed by plasma CVD using silane and ammonia gas as main constituents. A contact hole a 113 for electrically connecting the source electrode 106 to the pixel electrode 110 is then patterned into a predetermined shape.

Next, as shown in FIG. 7F, a film is formed by sputtering by using a transparent conductive film such as ITO, patterned into a predetermined shape, and etched to form the pixel electrode 110. In this way, a TFT array substrate is completed. In this TFT substrate, the gate bus line 101, the drain bus line 106, and the pixel electrode 110 are insulated from each other by the insulating layer a 103 and the insulating layer b 109.

In the TFT array substrate obtained as described above, compared to the prior art shown in FIGS. 3, 4A to 4F, and 5A to 5F, the pixel electrode 110 can be extended to a region above the drain bus line 106. This makes this TFT array substrate superior to the first prior art. That is, the aperture ratio can be increased, and a point defect resulting from a short circuit of the drain bus line 106 and the pixel electrode 110 can be prevented because the drain bus line 106 is isolated from the pixel electrode 110 by the insulating layer b 109.

Unfortunately, the prior art shown in FIGS. 6, 7A to 7F, and 8A to 8F has the problem that the drain bus line 106 is easily disconnected because of its single-layered structure. More specifically, the drain bus line 106 at the intersection of the gate bus line 101 and the drain bus line 106 has a single-layered structure. Accordingly, when the drain bus line 106 is etched, a solution such as ammonium ceric nitrate permeates from the step portion and etches the metal pattern, or the drain bus line 106 cracks from the step portion. This results in a line defect which is a fatal defect for a liquid crystal display.

The structure of a TFT array disclosed in Japanese Unexamined Patent Publication No. 1-105575 is one countermeasure against a drain line defect as the problem of the prior art explained with reference to FIGS. 6, 7A to 7F, and 8A to 8F. As another example of the common active matrix TFT array structures, the structure and a method of fabricating the structure disclosed in Japanese Unexamined Patent Publication No. 1-105575 will be described below with reference to FIGS. 9, 10A to 10G, and 11A to 11G. FIG. 9 is a plan view showing the arrangement of electrodes and interconnections of one element in this conventional TFT array. FIGS. 10A to 10G and 11A to 11G are sectional views showing a process of fabricating sections taken along lines X—X and XI—XI in FIG. 9 in order of fabrication steps.

The process of fabricating this conventional TFT array will be described below with reference to FIGS. 9, 10A to 10G, and 11A to 11G. First, as shown in FIGS. 10A and 11A, a gate bus line 101 made of a Ti layer and a gate electrode 102 are formed on a transparent insulating substrate 100 such as a glass substrate.

As shown in FIGS. 10B and 11B, an insulating layer a (gate oxide film) 103 made of a material such as a silicon nitride film is formed.

Additionally, as shown in FIGS. 10C and 11C, a channel layer 104 made from intrinsic semiconductor amorphous silicon (to be referred to as "a-Si(I)" hereinafter), a silicon oxide film (not shown) as a protective film, and a contact layer (not shown) are formed on the insulating layer a 103 by chemical vapor deposition (P-CVD). Subsequently, a resist pattern for forming a self-aligned transistor is formed and used as a mask to etch the channel layer 104 and the silicon oxide film.

After that, as shown in FIGS. 10D and 11D, a contact layer 105 made from a-Si($n^+$) and Ti and Al layers as metal films for forming drain and source electrodes are formed. A resist film having a pattern for forming a drain electrode 107 and a source electrode 108 is formed and used as a mask to etch the Al layer, Ti layer, and contact layer 105.

Next, as shown in FIGS. 10E and 11E, the resist is removed, and polyimide serving as an insulating interlayer b 109 is formed. A resist film having a pattern which exposes a contact hole b 114 for the drain electrode 107 and the source electrode 108 is formed. Gas-plasma etching is performed by using this resist as a mask to pattern the insulating interlayer b 109.

As shown in FIGS. 10F and 11F, an ITO layer as a transparent conductive film is formed. An unnecessary portion of this ITO layer is removed by a lift-off method to form an ITO layer 112 for bridging a pixel electrode 110 and the drain electrode 107.

After that, as shown in FIGS. 10G and 11G, a Cr layer and an Al layer are formed on the ITO layer 112 as metal layers for forming a drain bus line 106, and these metal layers are patterned. Consequently, a two-layered drain bus line is formed across the entire region by the drain bus line 106 and the drain electrode 107 in portions except for the intersections between the drain bus line 106 and the gate bus line 101 and by the drain bus line 106 and the ITO layer 112 in the intersections between the drain bus line 106 and the gate bus line 101.

In this prior art, however, metal film formation and patterning must be performed twice to form the drain electrode 107 and the drain bus line 106, and this complicates the fabrication process. Also, the drain bus line 106 and the drain electrode 107 are electrically connected through the contact hole b 114. Accordingly, if the connecting resistance in the interface between the drain bus line 106 and the drain electrode 107 increases due to variations in the fabrication process, the TFT does not normally operate any longer. This increases defects such as point defects. Furthermore, since the drain bus line 106 and the pixel electrode 110 are formed on the same layer, the problems of inability to increase the aperture ratio and easy occurrence of point defects remain unsolved.

In the TFT structure of Japanese Examined Patent Publication No. 4-52925 shown in FIGS. 3, 4A to 4F, and 5A to 5F, the drain bus line 106 and the pixel electrode 110 are formed on the same layer, and the drain bus line 106 cannot be located close to the pixel electrode 110 accordingly so the aperture ratio cannot be increased. Additionally, a metal foreign matter or a pattern residue formed when the drain bus line 106 or the pixel electrode 110 is patterned short-circuits the drain bus line 106 and the pixel electrode 110. This results in a point defect.

To solve these problems in Japanese Examined Patent Publication No. 4-52925, the TFT structure of Japanese Unexamined Patent Publication No. 6-130416 shown in FIGS. 6, 7A to 7F, and 8A to 8F includes the drain bus line 106 having a single-layered structure. Accordingly, when the drain bus line 106 at the intersection of the gate bus line 101 and the drain bus line 106 is etched, a solution such as ammonium ceric nitrate permeates from the step portion and etches the metal pattern of, e.g., Cr, or the drain bus line 106 cracks from the step portion. This results in a line defect which is a fatal defect for a liquid crystal display.

To solve the problems of the above two prior arts, in the TFT structure of Japanese Unexamined Patent Publication No. 1-105575 shown in FIGS. 9, 10A to 10G, and 11A to 11G, metal film formation and patterning must be performed twice to form the drain electrode 107 and the drain bus line 106, and this complicates the fabrication process. Also, the drain bus line 106 and the drain electrode 107 are electrically connected through the contact hole b 114. Accordingly, if the connecting resistance in the interface between the drain bus line 106 and the drain electrode 107 increases due to variations in the fabrication process, the TFT does not normally operate any longer. This increases defects such as point defects. Furthermore, since the drain bus line 106 and the pixel electrode 110 are formed on the same layer as in Japanese Examined Patent Publication No. 4-52925, the problems of inability to increase the aperture ratio and easy formation of point defects remain unsolved.

SUMMARY OF THE INVENTION

The present invention has been made in consideration of the above problems and has as its object to provide a liquid crystal display thin film transistor array which prevents a drain bus line from being disconnected by a step at an intersection between a gate bus line and the drain bus line without increasing the number of patterning steps, thereby preventing a line defect which is a fatal defect for a liquid crystal display.

To achieve the above object, according to the first principal aspect of the present invention, there is provided a liquid crystal display thin film transistor array comprising a plurality of parallel gate bus lines arranged on a transparent insulating substrate, a plurality of drain bus lines arranged perpendicularly to the gate bus lines and electrically isolated from the gate bus lines by a first insulating film, a thin film transistor arranged near an intersection of the gate bus line and the drain bus line, and a pixel electrode arranged in a region surrounded by the gate bus lines and the drain bus lines and made of a transparent conductive film, the thin film transistor comprising a gate electrode formed on the transparent insulating substrate and electrically connected to the gate bus line, a drain electrode formed via the first insulating film, a channel layer, and a contact layer and electrically connected to the drain bus line, and a source electrode formed via the first insulating film, the channel layer, and the contact layer and electrically connected to the pixel electrode, and the pixel electrode being electrically isolated from the drain electrode and the drain bus line by a second insulating film, wherein a contact hole which is to be electrically connected to the drain bus line is formed in the second insulating film stacked on the drain bus line in a region including the intersection of the gate bus line and the drain bus line, and an interconnection redundant film made of the same transparent conductive film as the pixel electrode is formed on the second insulating film so as to cover the contact hole.

With this arrangement, the drain bus line constitutes a two-layered structure together with the interconnection redundant film at the intersection between the gate bus line and the drain bus line where the drain bus line is easily disconnected. Consequently, a line defect resulting from disconnection of the drain bus line can be prevented.

Also, in the above liquid crystal display thin film transistor array, the contact hole can be formed in each of two positions, which correspond to two sides of the gate bus line, of the second insulating film in the region including the intersection of the gate bus line and the drain bus line. In this arrangement, a decrease in the aperture ratio of the liquid crystal display can be minimized.

Furthermore, the contact hole can be formed in the second insulating film across the gate bus line in the region including the intersection of the gate bus line and the drain bus line. In this arrangement, it is possible to decrease the area of the interconnection redundant film and ensure a sufficient distance to the pixel electrode. Consequently, a bright point defect caused by a short circuit between the pixel electrode and the interconnection redundant film can be prevented. Additionally, the resistance in the redundant portion can be lowered because it is only necessary to form the contact with the drain bus line once.

According to the second aspect of the present invention, there is provided a method of fabricating a liquid crystal display thin film transistor array, including the steps of patterning a gate bus line and a gate electrode on a transparent insulating substrate, sequentially forming a first insulating film, a channel layer made from intrinsic semiconductor amorphous silicon, and a contact layer made from n-type semiconductor amorphous silicon, and patterning the channel layer and the contact layer into an island shape, forming a through hole for electrically connecting the gate bus line, a first metal film forming the gate electrode, and a second metal film, to be formed later, in the first insulating film and forming a drain bus line, a drain electrode, and a source electrode, forming a second insulating film for electrically isolating the drain bus line and the drain electrode from a pixel electrode to be formed later, and forming a contact hole for electrically connecting the source electrode to the pixel electrode in the second insulating film and forming the pixel electrode by using a transparent conductive film, comprising forming a contact hole in the second insulating film on the drain bus line in a region where the gate bus line and the drain bus line intersect each other with the first insulating film interposed therebetween in the step of forming the contact hole for electrically connecting the source electrode to the pixel electrode, and forming a transparent conductive film for covering the contact hole formed in the second insulating film in the step of forming the pixel electrode.

In this method, it is unnecessary to add any new steps of forming the interconnection redundant film and the contact holes. Therefore, the number of patterning steps remains the same as that for conventional TFTs, so the fabrication process is not complicated and the fabrication cost is not increased.

The above and many other objects, features and advantages of the present invention will become manifest to those skilled in the art upon making reference to the following detailed description and accompanying drawings in which preferred embodiments incorporating the principles of the present invention are shown by way of illustrative examples.

DETAILED DESCRIPTION OF THE PREFERRED EMBODIMENTS

Several preferred embodiments of the present invention will be described below with reference to the accompanying drawings.

Figure 1:
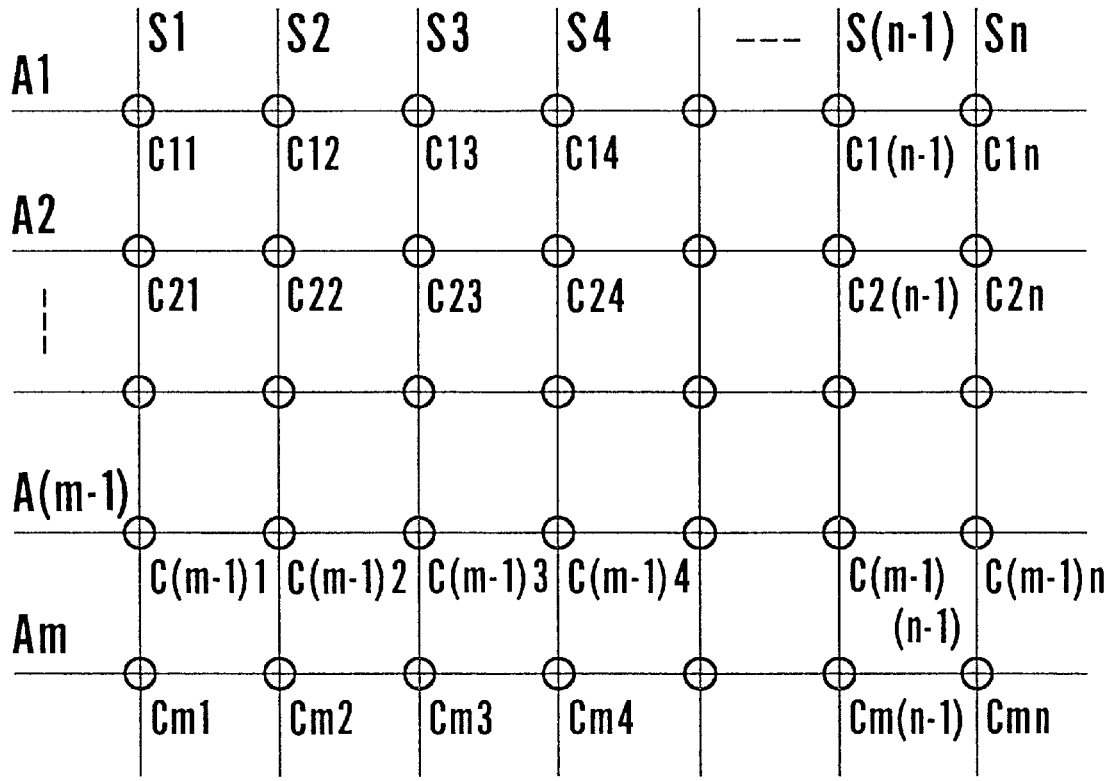
FIG. 1 is a view for explaining the basic circuit configuration of a conventional active matrix liquid crystal display thin film transistor array.
Figure 2:
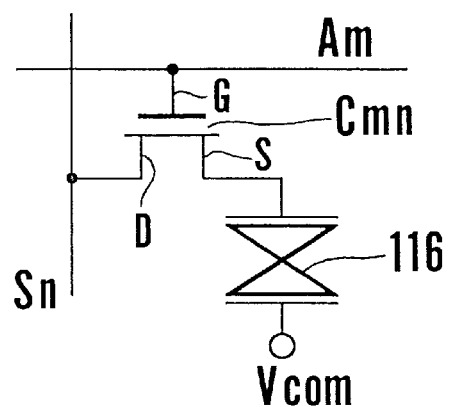
FIG. 2 is an equivalent circuit diagram of one pixel in the thin film transistor array shown in FIG. 1.
Figure 3:
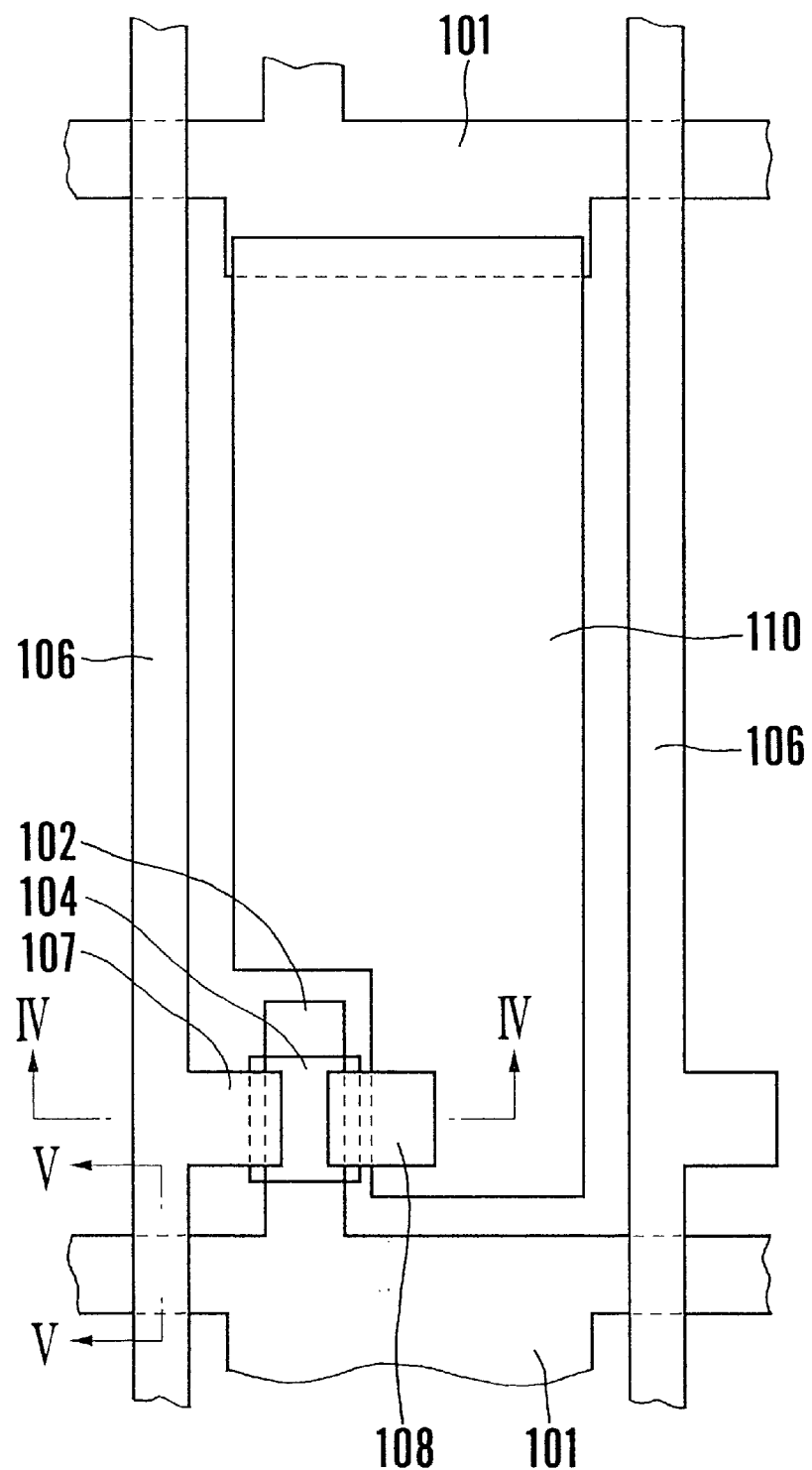
FIG. 3 is a plan view showing the arrangement of electrodes and interconnections of one element in the conventional liquid crystal display thin film transistor array.
Figure 4A:
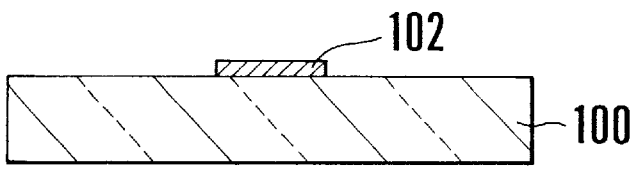
FIGS. 4A to 4F are sectional views showing a process of fabricating a section taken along a line IV—IV in FIG. 3 in order of fabrication steps.
Figure 4B:
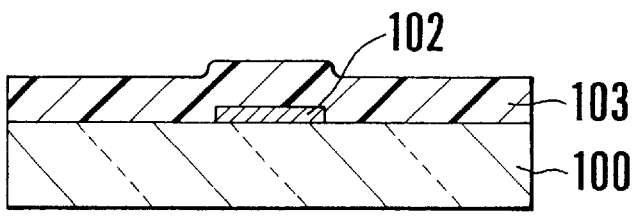
Figure 4C:
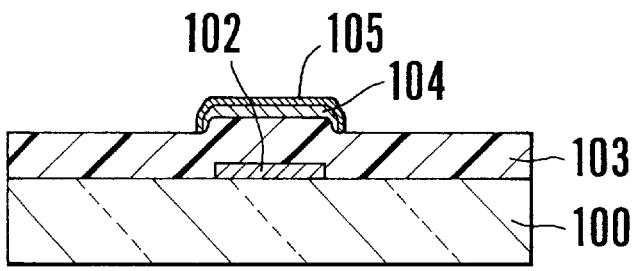
Figure 4D:
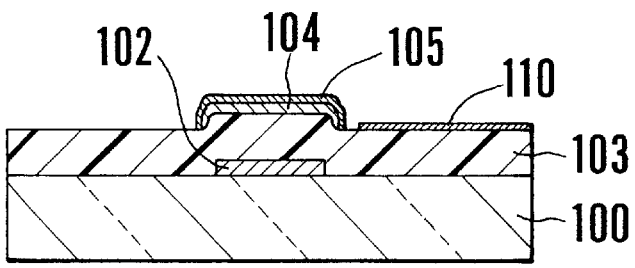
Figure 4E:
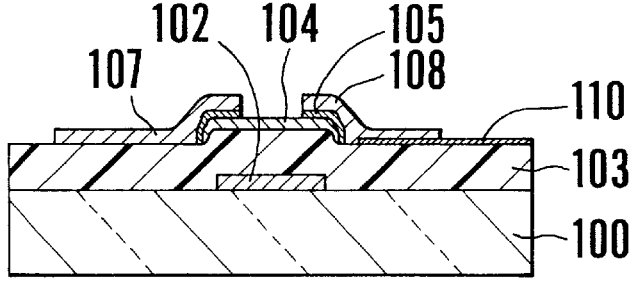
Figure 4F:
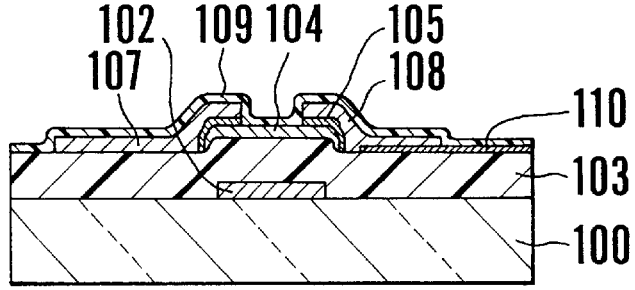
Figure 5A:
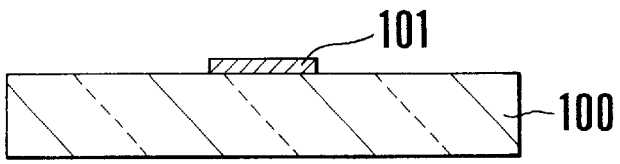
FIGS. 5A to 5F are sectional views showing a process of fabricating a section taken along a line V—V in FIG. 3 in order of fabrication steps.
Figure 5B:
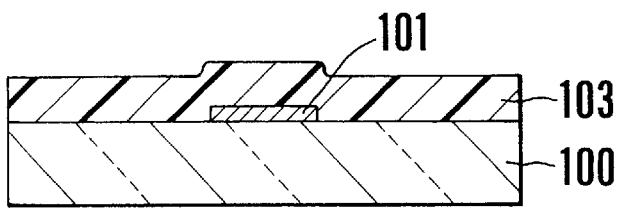
Figure 5C:
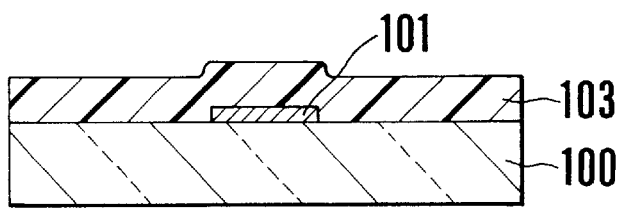
Figure 5D:
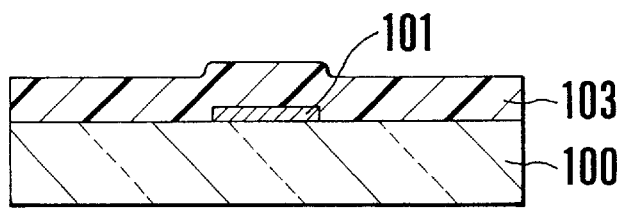
Figure 5E:
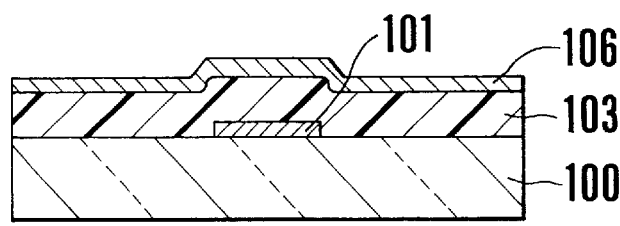
Figure 5F:
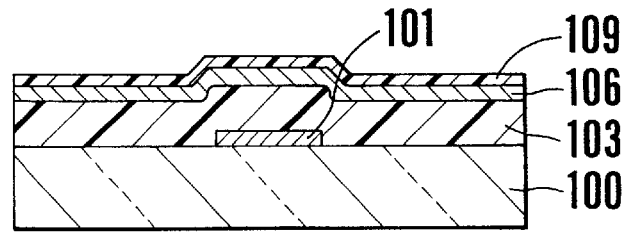
Figure 6:
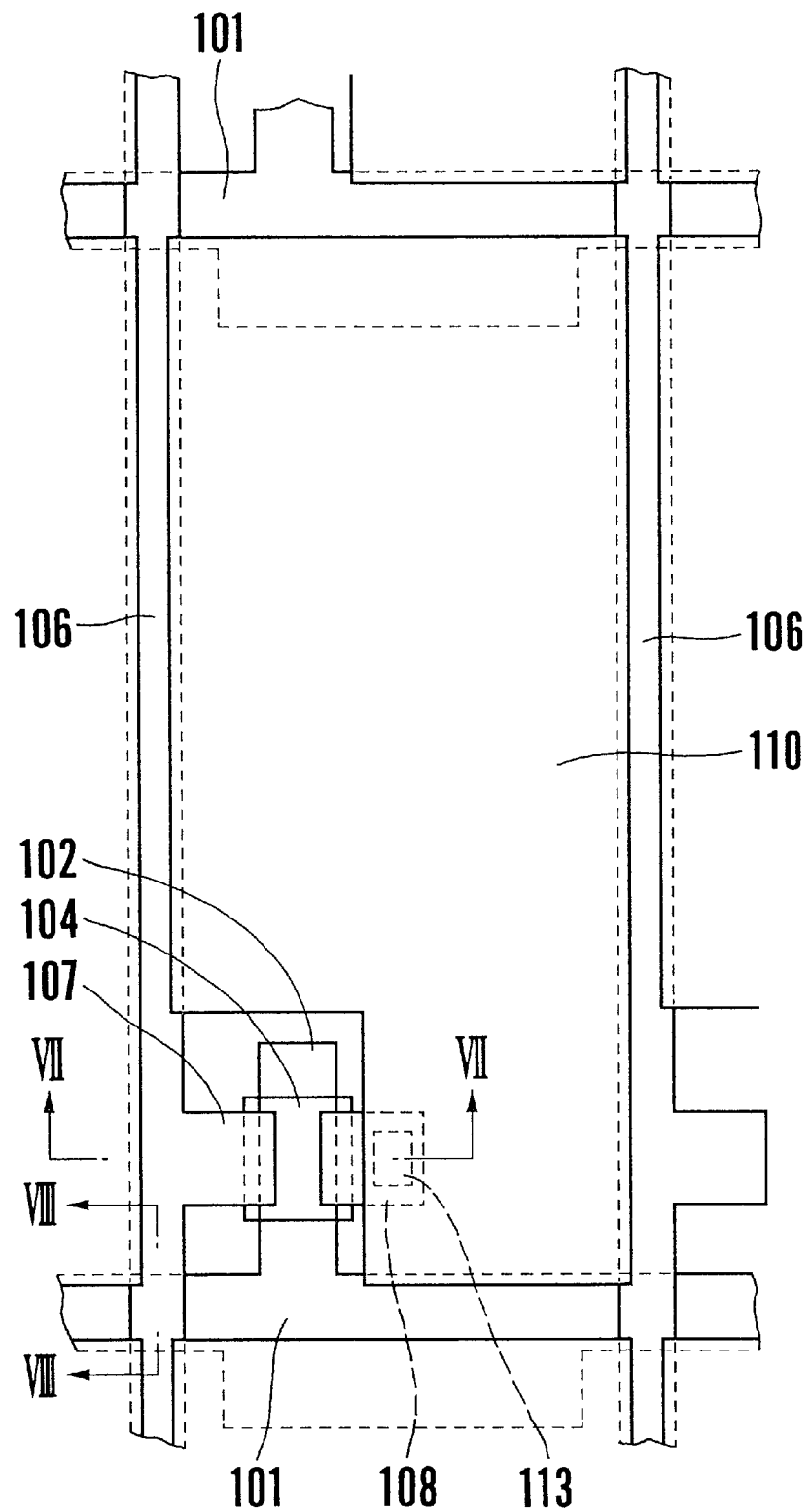
FIG. 6 is a plan view showing the arrangement of electrodes and interconnections of one element in a liquid crystal display thin film transistor array disclosed in Japanese Unexamined Patent Publication No. 6-130416.
Figure 7A:
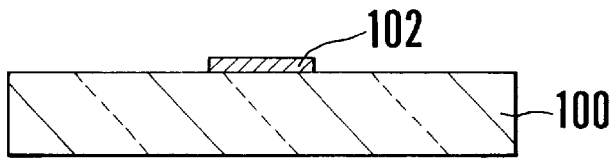
FIGS. 7A to 7F are sectional views showing a process of fabricating a section taken along a line VII—VII in FIG. 6 in order of fabrication steps.
Figure 7B:
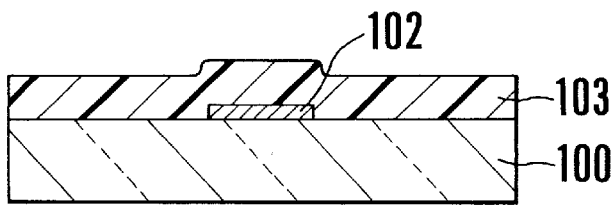
Figure 7C:
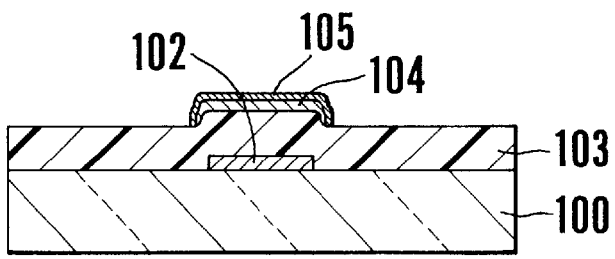
Figure 7D:
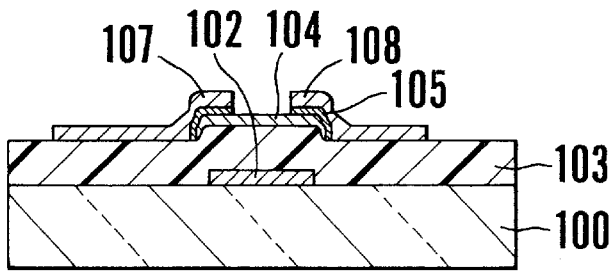
Figure 7E:
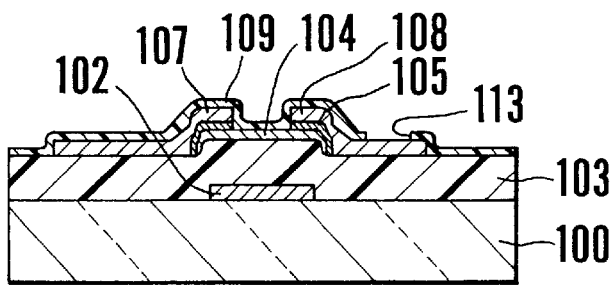
Figure 7F:
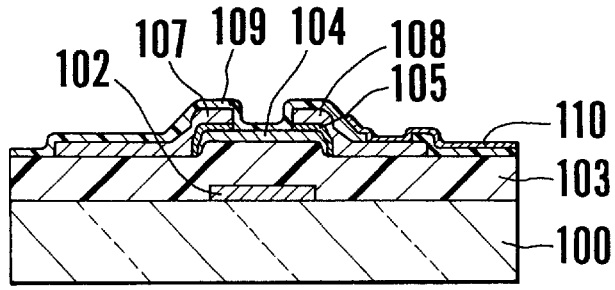
Figure 8A:
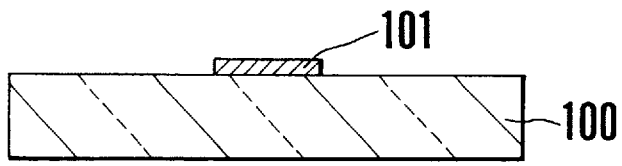
FIGS. 8A to 8F are sectional views showing a process of fabricating a section taken along a line VIII—VIII in FIG. 6 in order of fabrication steps.
Figure 8B:
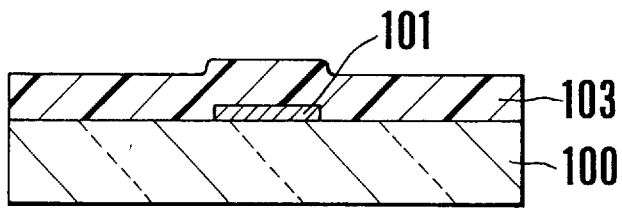
Figure 8C:
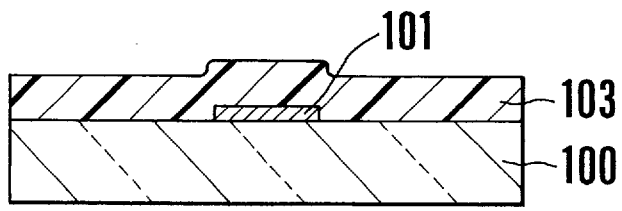
Figure 8D:
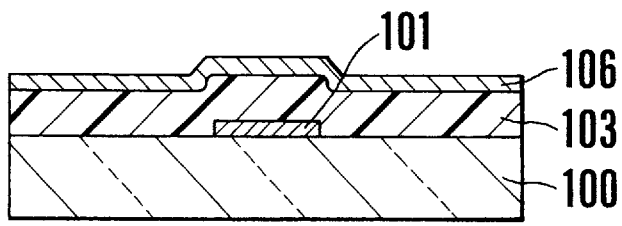
Figure 8E:
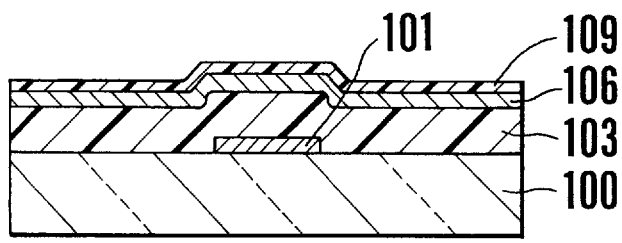
Figure 8F:
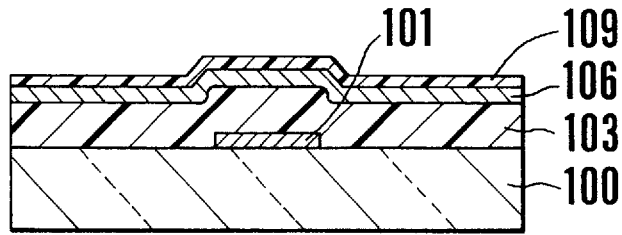
Figure 9:
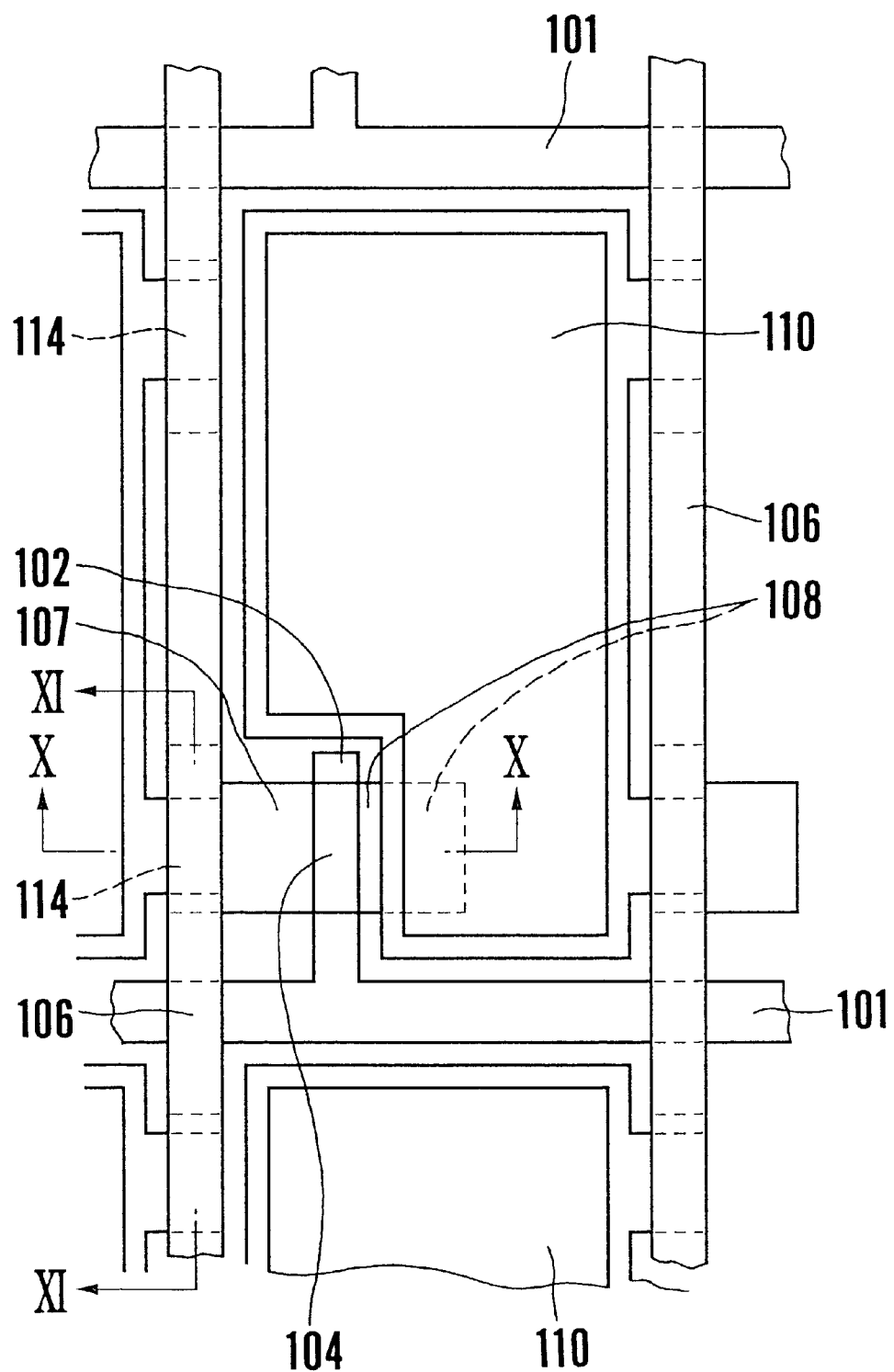
FIG. 9 is a plan view showing the arrangement of electrodes and interconnections of one element in a liquid crystal display thin film transistor array disclosed in Japanese Unexamined Patent Publication No. 1-105575.
Figure 10A:
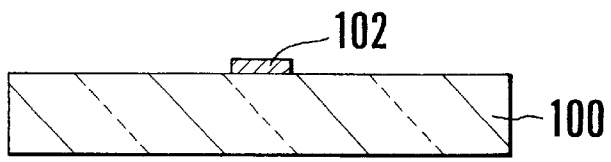
FIGS. 10A to 10G are sectional views showing a process of fabricating a section taken along a line X—X in FIG. 9 in order of fabrication steps.
Figure 10B:
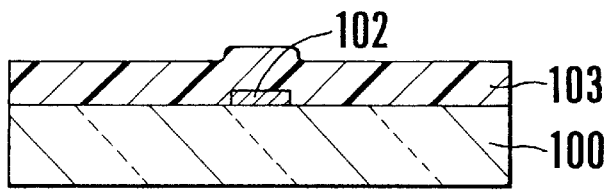
Figure 10C:
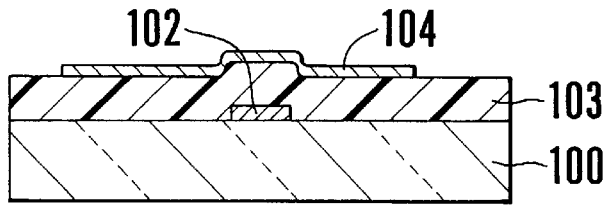
Figure 10D:
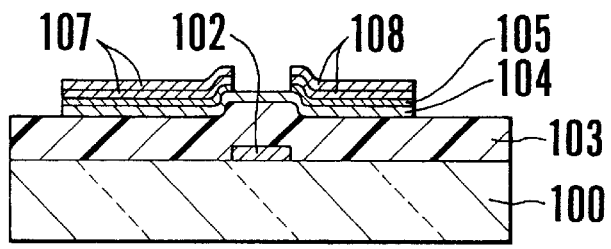
Figure 10E:
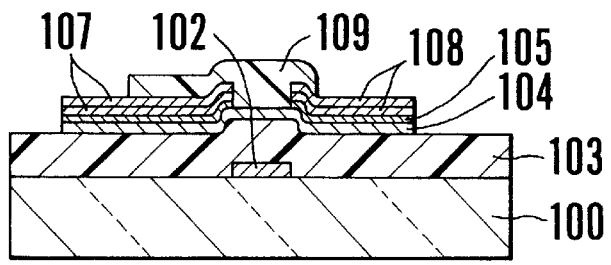
Figure 10F:
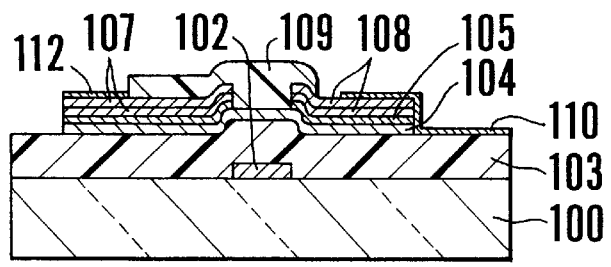
Figure 10G:
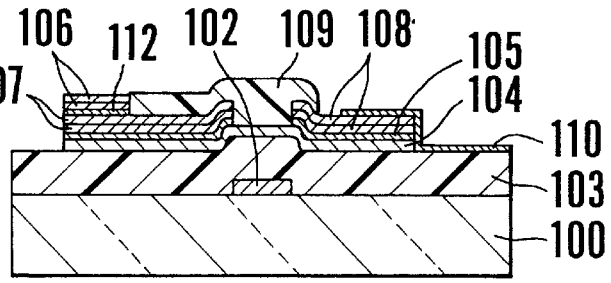
Figure 11A:
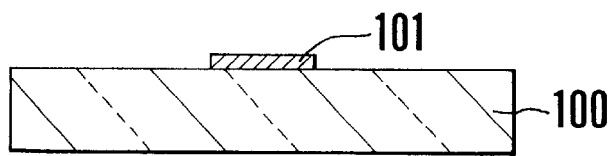
FIGS. 11A to 11G are sectional views showing a process of fabricating a section taken along a line XI—XI in FIG. 9 in order of fabrication steps.
Figure 11B:
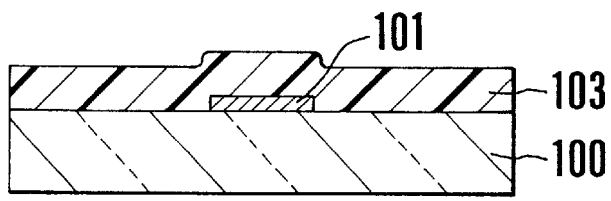
Figure 11C:
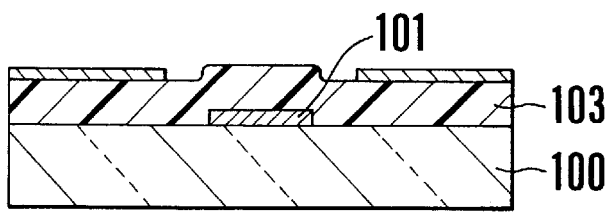
Figure 11D:
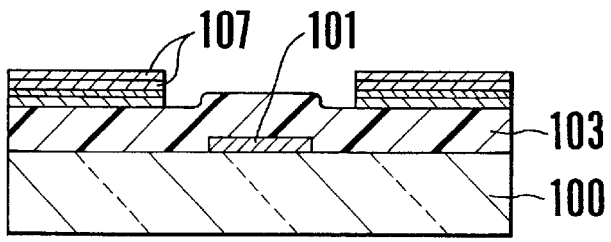
Figure 11E:
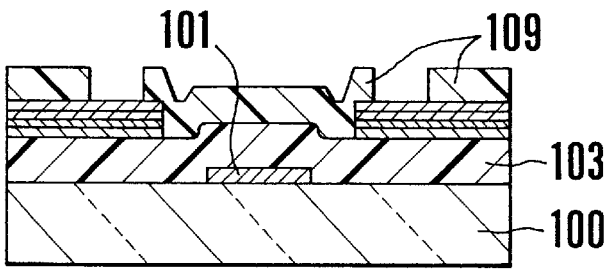
Figure 11F:
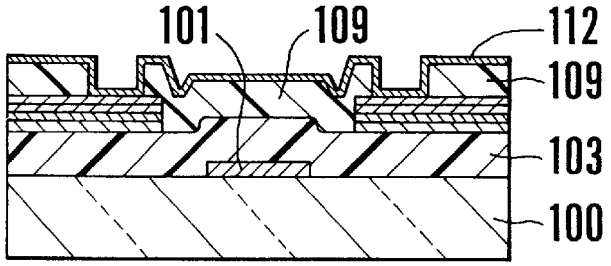
Figure 11G:
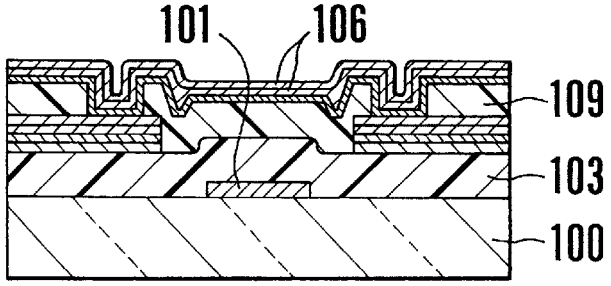
Figure 12:
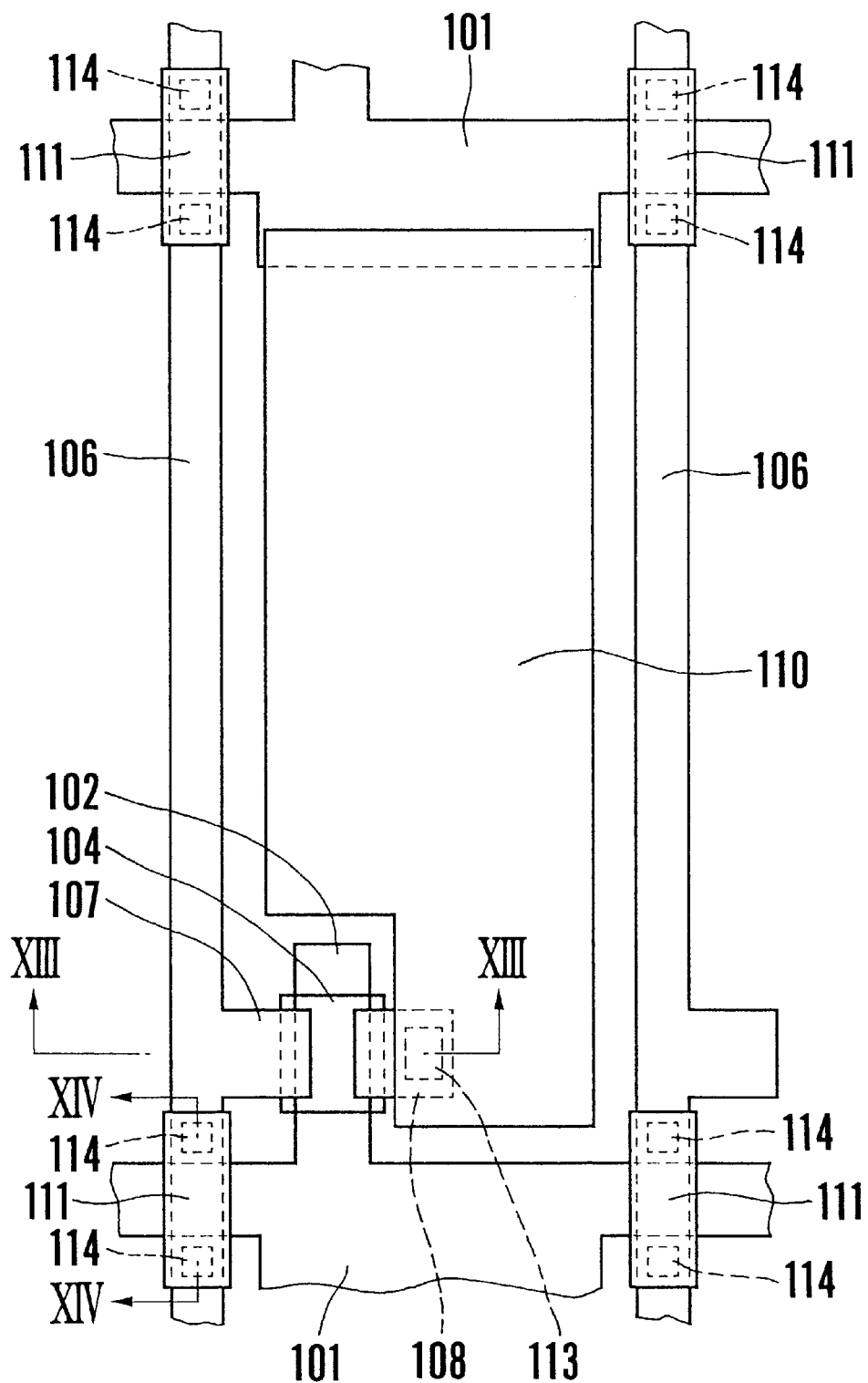
FIG. 12 is a plan view showing the arrangement of electrodes and interconnections of one element in a liquid crystal display thin film transistor array according to the first embodiment of the present invention.

First, an active matrix liquid crystal display TFT array according to the first embodiment of the present invention will be described below with reference to FIGS. 12, 13A to 13F, and 14A to 14F. FIG. 12 is a plan view showing the arrangement of electrodes and interconnections of one element in this TFT array. FIGS. 13A to 13F and 14A to 14F are sectional views showing a process of fabricating sections taken along lines XIII—XIII and XIV—XIV, respectively, in FIG. 12 in order of fabrication steps.

Figure 13A:
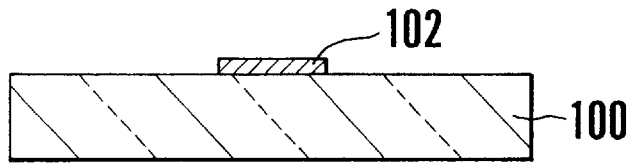
FIGS. 13A to 13F are sectional views showing a process of fabricating a section taken along a line XIII—XIII in FIG. 12 in order of fabrication steps.

The TFT array fabrication process according to the present invention will be described below with reference to FIGS. 12, 13A to 13F, and 14A to 14F. As shown in FIGS. 13A and 14A, a 100- to 300-nm thick metal film of, e.g., Cr, Al, Ta, or Mo is formed on a transparent insulating substrate 100 such as a glass substrate by sputtering. After that, a resist film having a pattern for forming a gate bus line 101 and a gate electrode 102 is formed. This resist film is used as a mask to etch the metal film of, e.g., Cr, Al, Ta, or Mo and form the gate bus line 101 and the gate electrode 102.

Figure 13B:
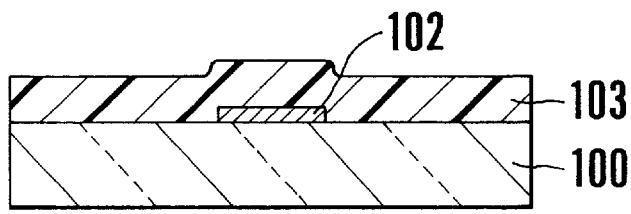
Figure 13C:
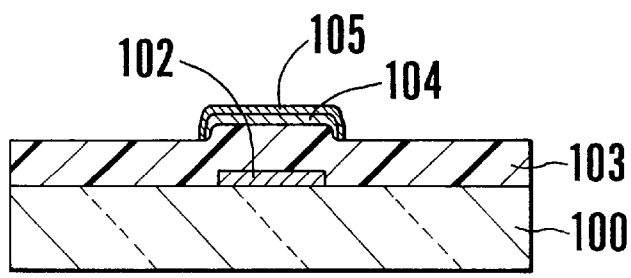
Figure 14A:
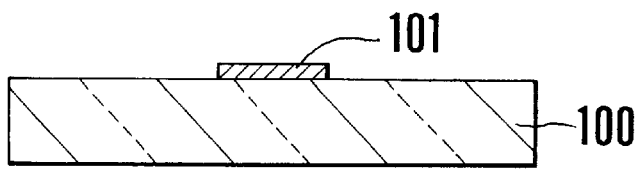
FIGS. 14A to 14F are sectional views showing a process of fabricating a section taken along a line XIV—XIV in FIG. 12 in order of fabrication steps.
Figure 14B:
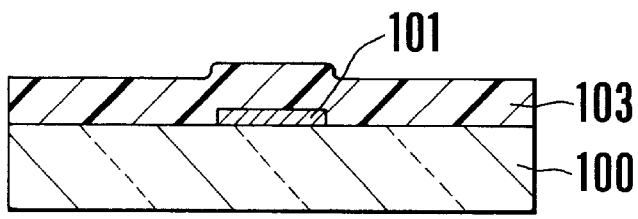
Figure 14C:
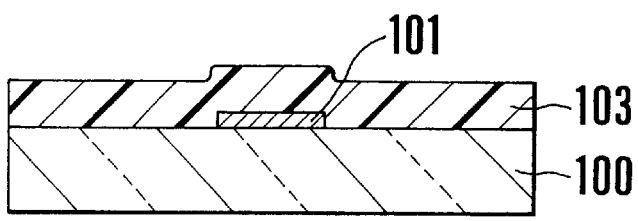

After the resist film is removed, as shown in FIGS. 13B and 14B, a 200- to 600-nm thick silicon nitride film serving as an insulating film (gate oxide film) 103 is deposited by plasma CVD using silane and ammonia gas as main constituents. Additionally, a 50- to 300-nm thick a-Si(I) film serving as a channel layer 104 is deposited by plasma CVD using silane as a main constituent. Also, a 30- to 100-nm thick a-Si(n⁺) film serving as a contact layer 105 for electrically connecting the channel layer 104 to a drain electrode 107 and a source electrode 108 (to be formed later) is deposited by plasma CVD using silane and phosphine gas as main constituents. As shown in FIG. 13C, a resist film having a pattern for forming the channel layer 104 and the contact layer 105 is formed and used as a mask to perform etching and form a predetermined shape.

The resist film is removed, and another resist film is formed which has a pattern for etching away a portion of the insulating layer 103 from the surface of the metal film of, e.g., Cr, Al, Ta, or Mo in a peripheral terminal portion (not shown) for mounting an external driving circuit for applying a signal to the gate bus line 101 and a drain bus line 106 (to be formed later). This resist film is used as a mask to etch the insulating layer 103 into a predetermined shape and form a through hole (not shown). After the resist film is removed, a 100- to 300-nm thick metal film of, e.g., Cr, Al, Ta, or Mo is formed by sputtering. After that, a resist film having a pattern for forming a predetermined shape is formed and used as a mask to perform etching and form the drain bus line 106, the drain electrode 107, and the source electrode 108.

Figure 13D:
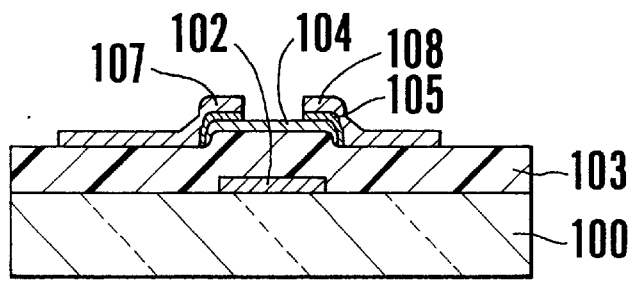
Figure 14D:
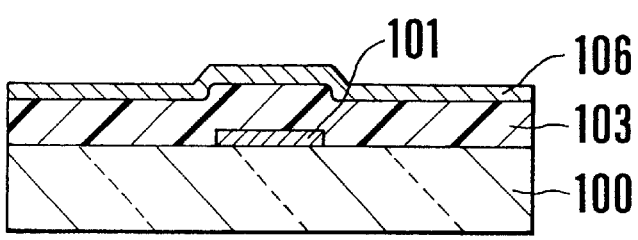

After the resist film is removed, as shown in FIGS. 13D and 14D, the drain electrode 107 and the source electrode 108 are used as masks to etch away an unnecessary portion of the contact layer 105 from the channel layer 104, in order to divide the contact layer 105 into a portion on the drain electrode 107 side and a portion on the source electrode 108 side.

Figure 13E:
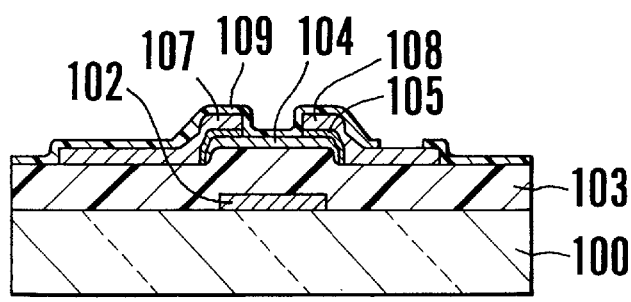
Figure 14E:
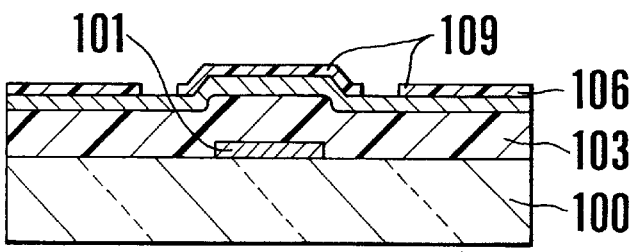

Next, to form an insulating layer 109 for separating the drain bus line 106 from a pixel electrode 110 (to be formed later), a 100- to 400-nm thick silicon nitride film is formed by plasma CVD using silane and ammonia gas as main constituents. After that, as shown in FIGS. 13E and 14E, a resist film is formed which has a pattern for forming a predetermined shape, i.e., for forming a contact hole 113 for electrically connecting the source electrode 108 to the pixel electrode 110 and contact holes 114 for electrically connecting an interconnection redundant film 111 (FIG. 14F), made of the same material as the pixel electrode 110, to the drain bus line 106. After the resist film is formed, etching is performed.

Figure 13F:
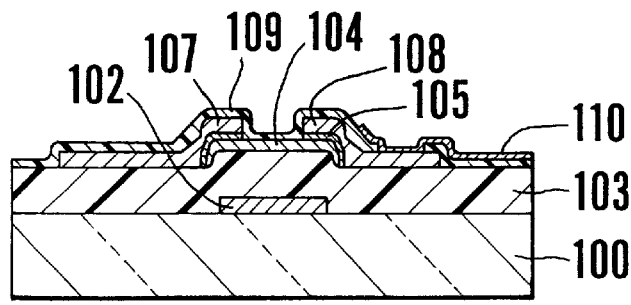
Figure 14F:
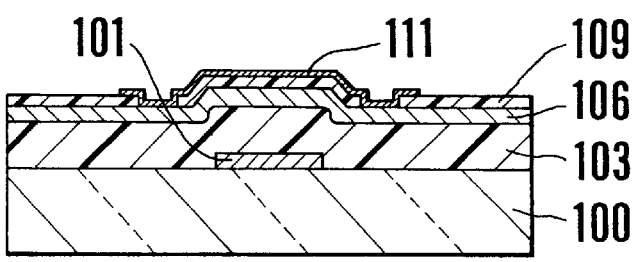

After the resist film is removed, a transparent conductive material such as ITO is formed by sputtering. A resist film having a pattern for forming a predetermined shape is formed and used as a mask to perform etching. Consequently, as shown in FIGS. 13F and 14F, the pixel electrode 110 and the interconnection redundant film 111 are formed, and a TFT array substrate is completed.

In the TFT array substrate according to the first embodiment obtained as described above, as shown in FIG. 12, the interconnection redundant film 111 is formed on the insulating layer 109 at the intersection between the gate bus line 101 and the drain bus line 106 where the drain bus line 106 is readily disconnected. Also, the drain bus line 106 and the interconnection redundant film 111 are electrically connected through the contact holes 114 formed in portions corresponding to the two sides of the gate bus line 101. Consequently, the drain bus line 106 at the intersection has a two-layered structure.

The contact holes 114 formed on the two sides of the interconnection redundant film 111 to form the two-layered structure of the interconnection redundant film 111 and the drain bus line 106 are 4 to 5 μm square or more in order to reliably form the contact with the drain bus line 106. In the widthwise direction of the drain bus line 106, however, the contact holes 114 are formed about 1 μm inside the end face of the drain bus line 106 so that the insulating layer 103 is not etched when the overlying insulating layer 109 is etched.

The interconnection redundant film 111 has an enough size to well cover the intersection of the gate bus line 101 and the drain bus line 106 and the contact holes 114 formed on the two sides of the gate bus line 101. It is generally known that the patterning accuracy when the contact holes 114 and the interconnection redundant film 111 are formed is 1 μm or less and the overlay accuracy of the contact holes 114 and the interconnection redundant film 111 is about 1 μm. In the first embodiment, therefore, to allow the interconnection redundant film 111 to cover the contact holes 114 even if misalignment occurs due to the above accuracy, the size of the interconnection redundant film 111 is so set that the end portion of the interconnection redundant film 111 is formed apart 3 to 4 μm from the end portion of the contact hole 114.

In the first embodiment, the interconnection redundant film 111 is formed as described above. When the drain bus line 106 is etched, a solution such as ammonium ceric nitrate may permeate from the step portion and etch the metal pattern of, e.g., Cr, or the drain bus line 106 may crack from the step portion. Even if this occurs, a line defect resulting from disconnection of the line can be prevented because the interconnection redundant film 111 with a redundant structure is formed in the step portion.

Additionally, the redundant structure of the interconnection redundant film 111 is formed only at the intersection between the gate bus line 101 and the drain bus line 106. This minimizes a decrease in the aperture ratio.

In the first embodiment, the interconnection redundant film 111 is formed by using the same patterning step as for forming the pixel electrode 110. Also, the two-layered structure is formed by electrically connecting the drain bus line 106, in a portion where the gate bus line 101 and the drain bus line 106 intersect each other with the insulating layer 103 being interposed between them, to the interconnection redundant film 111. Accordingly, the contact holes 114 are formed in the insulating layer 109 in the same patterning step as for forming the contact hole 113 for electrically connecting the source electrode 108 to the pixel electrode 110 in the insulating layer 109. Consequently, the number of patterning steps remains the same as that for conventional TFTs, so the fabrication process is not complicated.

Figure 15:
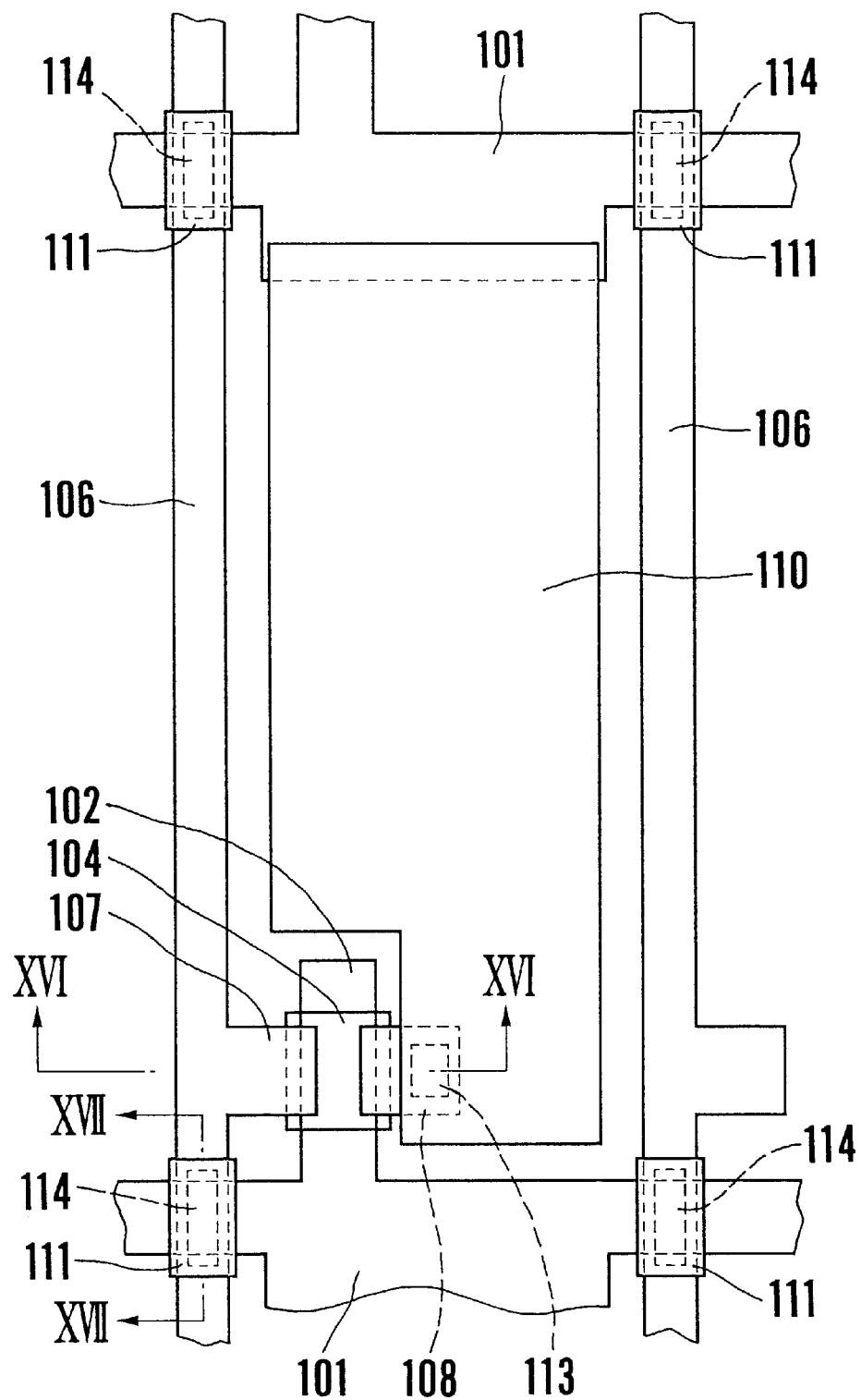
FIG. 15 is a plan view showing the arrangement of electrodes and interconnections of one element in a liquid crystal display thin film transistor array according to the second embodiment of the present invention.
Figure 16A:
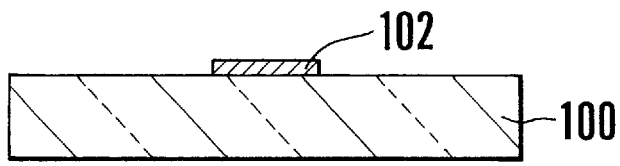
FIGS. 16A to 16F are sectional views showing a process of fabricating a section taken along a line XVI—XVI in FIG. 15 in order of fabrication steps.
Figure 16B:
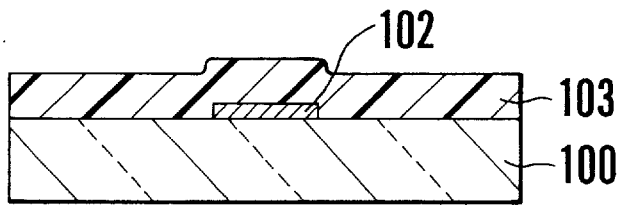
Figure 16C:
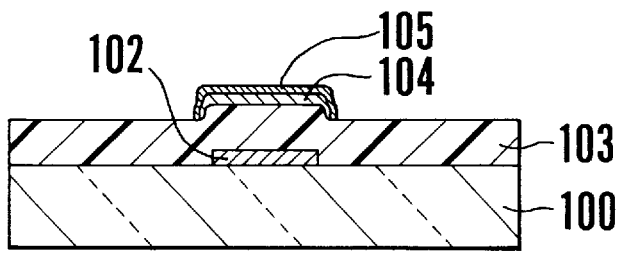
Figure 16D:
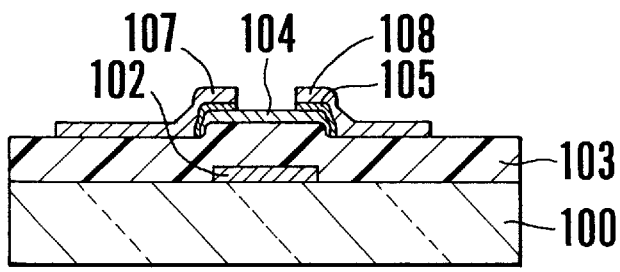
Figure 16E:
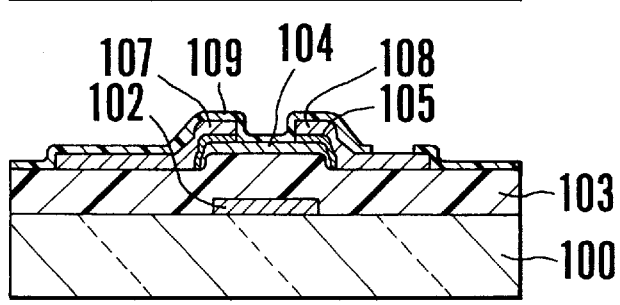
Figure 16F:
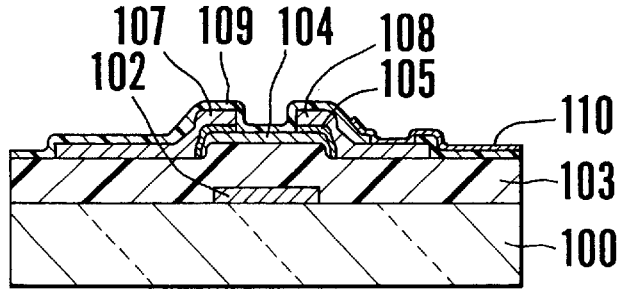

Next, an active matrix liquid crystal display TFT array according to the second embodiment of the present invention will be described below with reference to FIGS. 15, 16A to 16F, and 17A to 17F. FIG. 15 is a plan view showing the arrangement of electrodes and interconnections of one element in this TFT array. FIGS. 16A to 16F and 17A to 17F are sectional views showing a process of fabricating sections taken along lines XVI—XVI and XVII—XVII, respectively, in FIG. 15 in order of fabrication steps.

Figure 17A:
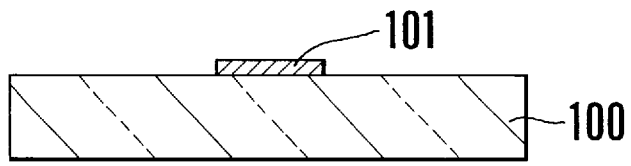
FIGS. 17A to 17F are sectional views showing a process of fabricating a section taken along a line XVII—XVII in FIG. 15 in order of fabrication steps.
Figure 17B:
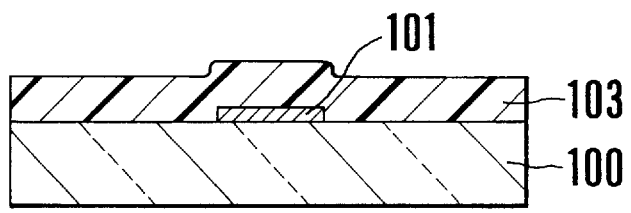
Figure 17C:
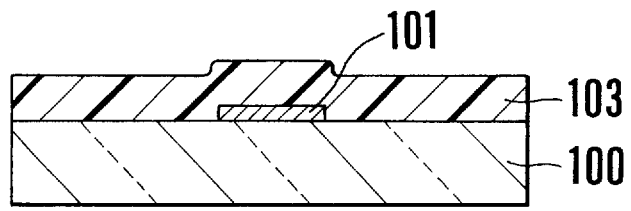
Figure 17D:
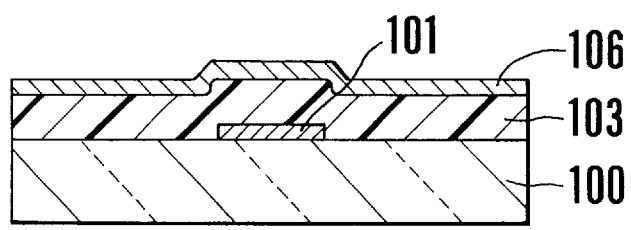
Figure 17E:
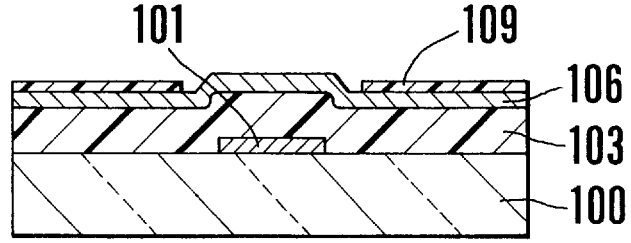

Note that the order of the TFT array fabrication steps shown in FIGS. 15, 16A to 16F, and 17A to 17F is the same as in the first embodiment shown in FIGS. 12, 13A to 13F, and 14A to 14F, so a detailed description of the same fabrication steps will be omitted. The difference from the first embodiment is that, as shown in FIG. 17E, a contact hole 114 for electrically connecting an interconnection redundant film 111 (FIG. 17F), made of the same material as a pixel electrode 110, to a drain bus line 106 is formed by etching away an insulating layer 109 from the intersection between a gate bus line 101 and the drain bus line 106 where the drain bus line 106 is readily disconnected.

Figure 17F:
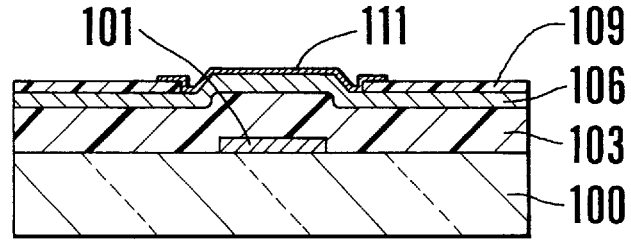

As shown in FIGS. 15 and 17F, the interconnection redundant film 111 is formed on the drain bus line 106 exposed in the contact hole 114. This gives the drain bus line 106 a two-layered structure at the intersection between the gate bus line 101 and the drain bus line 106.

In the widthwise direction of the drain bus line 106, the contact hole 114 for forming the two-layered structure of the interconnection redundant film 111 and the drain bus line 106 is formed by patterning about 1 μm inside the end face of the drain bus line 106 so that an insulating layer 103 is not etched when an overlying insulating layer 119 is etched. Also, the interconnection redundant film 111 is formed by patterning 4 to 5 μm outside the end face of the gate bus line 101 at the intersection of the drain bus line 106 and the gate bus line 101.

The interconnection redundant film 111 has an enough size to well cover the intersection of the gate bus line 101 and the drain bus line 106 and the contact hole 114. It is generally known that the patterning accuracy when the contact hole 114 and the interconnection redundant film 111 are formed is 1 μm or less and the overlay accuracy of the contact hole 114 and the interconnection redundant film 111 is about 1 μm. In the second embodiment, therefore, to allow the interconnection redundant film 111 to cover the contact hole 114 even if misalignment occurs due to the above accuracy, the size of the interconnection redundant film 111 is so set that the end portion of the interconnection redundant film 111 is formed apart 3 to 4 μm from the end portion of the contact hole 114.

In the second embodiment, the interconnection redundant film 111 is formed as described above. When the drain bus line 106 is etched, a solution such as ammonium ceric nitrate may permeate from the step portion and etch the metal pattern of, e.g., Cr, or the drain bus line 106 may crack from the step portion. Even if this occurs, a line defect resulting from disconnection of the line can be prevented because the interconnection redundant film 111 with a redundant structure is formed in the step portion.

Compared to the first embodiment, the contact hole is formed only at the intersection between the gate bus line 101 and the drain bus line 106. This relatively decreases the area of the interconnection redundant film 111. Since the size of the interconnection redundant film 111 can be decreased, it is possible to ensure a sufficient distance to the pixel electrode 110 formed in the same layer as the interconnection redundant film 111. Consequently, a bright point defect caused by a short circuit between the pixel electrode 110 and the interconnection redundant film 111 can be prevented.

Also, even when the insulating layer 109 is formed by a thick (about 2 to 3 μm) material such as a photosensitive acrylic resin, the interconnection redundant film 111 does not crack due to the step on the insulating layer 109 because the interconnection redundant film 111 directly covers the drain bus line 106 at the intersection between the gate bus line 101 and the drain bus line 106. This increases the redundancy of the drain bus line 106 at the intersection. Another advantage is that the resistance in the redundant portion lowers because it is only necessary to form the contact with the drain bus line 106 once.

As in the first embodiment, the interconnection redundant film 111 is formed by using the same patterning step as for forming the pixel electrode 110. Also, the two-layered structure is formed by electrically connecting the drain bus line 106, in a portion where the gate bus line 101 and the drain bus line 106 intersect each other with the insulating layer 103 being interposed between them, to the interconnection redundant film 111. Accordingly, the contact hole 114 is formed in the insulating layer 109 in the same patterning step as for forming the contact hole 113 for electrically connecting the source electrode 108 to the pixel electrode 110 in the insulating layer 109. Consequently, the number of patterning steps remains the same as that for conventional TFTs, so the fabrication process is not complicated.

The two preferred embodiments of the present invention have been described above. However, the present invention is not restricted to these embodiments and can be modified without departing from the scope of the invention described in the appended claims. For example, it is possible to form the gate bus line, gate electrode, drain bus line, drain electrode, source electrode, pixel element, interconnection redundant film, and the like by using other metals or composite films and form the insulating layers by using various insulating films or composite films.

What is claimed is:

1. A liquid crystal display thin film transistor array comprising:

a plurality of parallel gate bus lines arranged on a transparent insulating substrate;

a plurality of drain bus lines arranged perpendicularly to said gate bus lines and electrically isolated from said gate bus lines by a first insulating film;

a thin film transistor arranged near an intersection of said gate bus line and said drain bus line; and a pixel electrode arranged in a region surrounded by said gate bus lines and said drain bus lines and made of a transparent conductive film, said thin film transistor comprising a gate electrode formed on said transparent insulating substrate and electrically connected to said gate bus line, a drain electrode formed via said first insulating film, a channel layer, and a contact layer and electrically connected to said drain bus line, and a source electrode formed via said first insulating film, said channel layer, and said contact layer and electrically connected to said pixel electrode, and said pixel electrode being electrically isolated from said drain electrode and said drain bus line by a second insulating film, wherein a contact hole which is to be electrically connected to said drain bus line is formed in said second insulating film stacked on said drain bus line in a region including the intersection of said gate bus line and said drain bus line, and an interconnection redundant film made of the same transparent conductive film as said pixel electrode is formed on said second insulating film so as to cover said contact hole.

2. An array according to claim 1, wherein said contact hole is formed in each of two positions, which correspond to two sides of said gate bus line, of said second insulating film in the region including the intersection of said gate bus line and said drain bus line.

3. An array according to claim 1, wherein said contact hole is formed in said second insulating film across said gate bus line in the region including the intersection of said gate bus line and said drain bus line.

4. An array according to claim 2, wherein said contact hole is at least 4 μm square and is formed not less than 1 μm inside an end face of said drain bus line.

5. An array according to claim 4, wherein an end portion of said interconnection redundant film is formed apart 3 to 4 μm from an end portion of said contact hole.

6. An array according to claim 3, wherein said contact hole is formed not less than 1 μm inside an end face of said drain bus line and 4 to 5 μm outside an end face of said gate bus line.

7. An array according to claim 6, wherein an end portion of said interconnection redundant film is formed apart 3 to 4 μm from an end portion of said contact hole.

8. A method of fabricating a liquid crystal display thin film transistor array, including the steps of patterning a gate bus line and a gate electrode on a transparent insulating substrate, sequentially forming a first insulating film, a channel layer made from intrinsic semiconductor amorphous silicon, and a contact layer made from n-type semiconductor amorphous silicon, and patterning said channel layer and said contact layer into an island shape, forming a through hole for electrically connecting said gate bus line, a first metal film forming said gate electrode, and a second metal film, to be formed later, in said first insulating film and forming a drain bus line, a drain electrode, and a source electrode, forming a second insulating film for electrically isolating said drain bus line and said drain electrode from a pixel electrode to be formed later, and forming a contact hole for electrically connecting said source electrode to said pixel electrode in said second insulating film and forming said pixel electrode by using a transparent conductive film, comprising:

forming a contact hole in said second insulating film on said drain bus line in a region where said gate bus line and said drain bus line intersect each other with said first insulating film interposed therebetween in the step of forming said contact hole for electrically connecting said source electrode to said pixel electrode; and forming a transparent conductive film for covering said contact hole formed in said second insulating film in the step of forming said pixel electrode.

* * * * *